(12) United States Patent
Pennington et al.

(10) Patent No.: US 6,265,330 B1
(45) Date of Patent: Jul. 24, 2001

(54) NON-ASBESTOS INSULATION FOR ROCKET MOTOR CASING

(75) Inventors: William L. Pennington, Morgantown, WV (US); Edward G. Skolnik, Springfield; Thomas F. Davidson, Manassas, both of VA (US)

(73) Assignee: Atlantic Research Corporation, Gainesville, VA (US)

( * ) Notice: Subject to any disclaimer, the term of this patent is extended or adjusted under 35 U.S.C. 154(b) by 0 days.

(21) Appl. No.: 09/059,560

(22) Filed: Apr. 14, 1998
(Under 37 CFR 1.47)

(51) Int. Cl.⁷ ........................................ B32B 5/02
(52) U.S. Cl. .................. 442/136; 442/180; 428/920; 428/921
(58) Field of Search ................... 442/180, 136; 428/920, 921

(56) References Cited

U.S. PATENT DOCUMENTS

| | | | |
|---|---|---|---|
| H1140 | 2/1993 | Greenwood et al. | 523/180 |
| 3,243,956 | 4/1966 | Hamm et al. | 60/35 |
| 3,269,113 | 8/1966 | Crews et al. | 60/35 |
| 3,928,965 | 12/1975 | Macbeth | 60/255 |
| 3,990,369 | 11/1976 | Sayles | 102/103 |
| 4,495,764 | 1/1985 | Gnagy | 60/255 |
| 4,501,841 | 2/1985 | Herring | 524/411 |
| 4,507,165 | 3/1985 | Herring | 156/191 |
| 4,632,847 | 12/1986 | Lomasney et al. | 427/154 |
| 5,388,399 | 2/1995 | Figge et al. | 60/253 |

FOREIGN PATENT DOCUMENTS 9-169029 * 6/1997 (JP) .

* cited by examiner

Primary Examiner—Elizabeth M. Cole
(74) Attorney, Agent, or Firm—Nixon & Vanderhye P.C.

(57) ABSTRACT

An insulation material for a rocket motor is described, which is composed of a glass fabric, a resin binder, and a fire retardant. The resin binder preferably is composed of a phenolic resin and a Buna-N rubber, and the fire retardant is preferably alumina trihydrate. A method of manufacturing the insulation material is also described.

17 Claims, No Drawings

NON-ASBESTOS INSULATION FOR ROCKET MOTOR CASING

TECHNICAL FIELD

The present invention relates to non-asbestos insulation materials particularly for use in rocket motor casings.

BACKGROUND ART

Solid fuel rockets are in widespread use due to the many advantages of working with solid propellants as opposed to liquid or gaseous fuels. Typically, solid fuel rocket motors provide the solid propellant within one or more annular metal rings, which are flexible to allow for temperature-induced expansion and contraction. Between the outermost annular ring and the exterior wall of the rocket motor a layer of insulation is provided, which is adhesively bonded to the inner surface of the external casing.

Previous insulation materials have been composed of a range of asbestos and non-asbestos-type materials. Representative of asbestos containing materials are the asbestos-filled phenolic resins (U.S. Pat. No. 3,243,956), neoprene or nitrile rubber having a solid additive such as asbestos, impregnated therein (U.S. Pat. No. 3,269,113), and a reaction product of tung oil with a phenolic resin, which contains a filler such as powdered asbestos (U.S. Pat. No. 3,990,369).

Due to the environmental and health concerns associated with the use of asbestos, various non-asbestos approaches to rocket motor insulation have been proposed in recent years. One approach employs two layers of material, the outermost layer being a sleeve composed of fiber glass impregnated with a high temperature resin, such as a phenolic resin, adjacent to which is provided a sheath composed of a high temperature rubber, such as Buna-N rubber (U.S. Pat. No. 3,928,965).

Also, a three component insulation wall assembly has been proposed, which contains a fire barrier layer, a middle thermal insulation layer, and an outer layer that provides structural stability. The fire barrier layer contains an ablative composite material within an ablative matrix material, such as a ceramic within a phenolic resin. The thermal insulation layer is made of a non-metallic honeycomb core material (U.S. Pat. No. 4,495,764).

Another approach is to employ an insulating adhesive to join the solid propellant to the rocket motor casing. A proposed material for use in this approach employs an epoxy resin, a chopped aramid (Kevlar) fiber pulp, and a microfine silicon dioxide filler (U.S. Statutory Invention Registration H1140). Relatedly, is an elastomeric insulating material comprising a crosslinked elastomeric polymer in which is dispersed a char-forming organic fiber, such as polyaramid pulp, and an inorganic particulate such as silica (U.S. Pat. No. 4,501,841). Hydrated alumina is mentioned as being an additive that can be used to enhance the flame-retardant properties of the insulation. U.S. Pat. No. 4,507,165 mentions that the polyaramid fibers can be replaced with cotton flock.

In yet another approach, a rocket motor insulation material is composed of a wound layer of insulation arranged about an inner solid propellant. The insulation layer contains a thermoplastic elastomer binder and is provided within an outer cylindrical casing formed of a composite material, such as graphite fibers and a thermoplastic elastomer binder. Representative of the thermoplastic elastomer binder is a polybutadiene/polystyrene block copolymer or fiberglass-reinforced polysulfone. A representative formulation for the insulation material contains thermoplastic elastomer binder at 57% by weight, alumina trihydrate at 13% by weight, other polybenzimidazole fibers at 16%–17% by weight, and lesser amounts of zinc borate and silene 732D. This particular arrangement of casing, insulation, and propellant, each of which contains thermoplastic elastomer binder, is reported to be effective in simultaneously fusing these layers to create a unitary motor structure (U.S. Pat. No. 5,388,399).

It is desired to develop a non-asbestos insulation material for use in rocket motors that is relatively simple to manufacture, has a low rate of char formation, and has improved resin curing properties. This object is met by the present invention.

SUMMARY OF THE INVENTION

The present invention is for a rocket motor insulation material that comprises a glass fabric and a resin composition, which resin composition contains alumina trihydrate. Asbestos is not a component of the material.

Preferably, an insulation material of the invention comprises glass fabric in about 35%–75% by weight and the resin composition in about 25%–65% by weight. It is preferred that the aforementioned resin composition comprises a phenolic resin and a Buna-N rubber, which is an acrylonitrile-butadiene-acrylic acid terpolymer. Preferably, the resin composition contains the phenolic resin in about 30%–60% by weight, the Buna-N rubber in about 1–30% by weight, and alumina trihydrate in about 5%–40% by weight.

An insulation material of the present invention is manufactured by combining a phenolic resin with a Buna-N rubber in an organic solvent, such as acetone. It is preferred that the alumina trihydrate also be added to this combination. The resulting mixture is then applied to a glass fabric in a ratio of about 40 parts resin mixture to 60 parts glass fabric. Upon drying of the fabric to remove solvent, the impregnated fabric can be wound on a spool. The insulation material can then be installed into a metal rocket casing and filled with a solid propellant.

The invention will now be described in more detail with reference to certain examples.

DETAILED DESCRIPTION OF THE INVENTION

The present invention is a rocket motor insulation material that is free of asbestos. The insulation material comprises a glass fabric, i.e., fiberglass, a resin binder component, and a fire retardant. The insulation material is prepared by combining the resin binder with the fire retardant in a suitable solvent. This mixture is then applied to the glass fabric, which is then dried to remove solvent.

A preferred glass weave fabric for use in the present invention is 1610 glass fabric available from Clark Schwabel, 2200 South Murray Ave., Anderson, S.C. 29622. This material provides an inert and flexible matrix for support of the fire retardant and resin binder. Other suitable glass fabrics include knit, mat and braid form with plain, leno, satin and basket styles. A common characteristic of these glass fabrics is the use of E-glass, although S-glass can also be used.

A glass fabric of the present invention preferably has areal weight in the range of about 1.4 to 53.0 oz./yd$^2$, particularly about 2.3 oz./yd$^2$. The glass fabric has a tensile strength of about 30 pound per lineal inch (pli), preferably in the range of about 20 to 50 pli.

A resin binder component of the present insulation material comprises a phenolic resin and a Buna-N rubber. The phenolic resin provides a good adherence of the binder to the glass fabric, while the Buna-N rubber provides a high temperature resistance. Representative of the phenolic resin is SC-1008, available from Borden Chemical Company, 6210 Camp Ground Rd., Louisville, Ky. 40216. Other suitable phenolic resins include Ironsides 91LD, Ashland Chemical 9201. The Buna-N rubber is an acrylonitrile-butadiene-acrylic acid terpolymer, such as is available from H.B. Fuller, 2400 Energy Park Dr., St. Paul, Minn. 55108. The phenolic resin and Buna-N rubber are conveniently dissolved in an organic solvent. Preferred organic solvents include acetone, and other low molecular ketones.

A phenolic resin for use of the present invention can be characterized in many respects, the most important of which for purposes of the present invention include percent solids, pK, and specific gravity. A preferred phenolic resin has solids present in an amount of about 30 to 60% by weight, preferably 63%. The pK for a preferred phenolic resin is in the range of about 4 to 10, particularly 8.2. A preferred specific gravity range is about 0.8 to 1.4 g/cc particularly about 1.1 g/cc.

The Buna-N rubber component of the resin binder of the present invention is primarily characterized in terms of percent solids. Preferably, the Buna-N rubber is provided in solution with an organic solvent in which the solids constitute about 22–26% by weight.

The fire retardant component of the present insulation material is preferably an inorganic filler, such as an alumina compound. Particularly preferred is alumina trihydrate. The fire retardant preferably has an average particle size in the range of about 1 to 200 microns and a density in the range of about 1.0 to 1.5 g/cc. Particularly preferred is alumina trihydrate having an average particle size of 8.5 microns and a density of 1.3 g/cc.

As mentioned above, an insulation material of the present invention comprises a glass fabric and a resin binder that contains a fire retardant, such as alumina trihydrate. The glass fabric is provided in the insulation material in a range of about 35–75% by weight, particularly preferred at about 60% by weight. The resin binder is provided in a range of about 25–65% by weight, particularly preferred at about 30% by weight. The resin binder composition can be further defined in terms of its respective components. Thus, a phenolic resin is provided in the resin binder at about 30–60% by weight, Buna-N rubber is provided in about 1–30% by weight, and alumina trihydrate is provided within the insulation material in about 5–40% by weight.

A preferred composition range for an insulation material of the present invention is shown in Table 1 hereinbelow.

TABLE 1

| Material | Weight % |
|---|---|
| Glass fabric | 35–75 |
| Resin binder | 25–65 |
| Resin binder | |
| phenolic resin | 30–60 |
| Buna-N rubber | 1–30 |
| Aluminum trihydrate | 5–40 |

Also contemplated is a rocket motor comprising an insulation material of the present invention. Such rocket motor includes a metal casing, the inner surface of which is lined with the present insulation material. Contained within the interior of the cylinder defined by the insulation material is the solid propellant. Additional annular rings and/or fibrous layers can be provided between the insulation material and the solid propellant.

Further contemplated is a method of manufacturing an insulation material of the present invention. An aforementioned glass fabric is coated/impregnated with a resin binder as described above, such as by drawing the fabric through a tray containing the resin binder. The resin binder is typically applied to the glass fabric in a ratio of about 40 parts resin to 60 parts glass fabric. The liquid resin binder composition contains the components the components mentioned hereinabove, which components can be combined in any order.

Once the resin mixture has been applied to the glass fabric, the fabric is then passed through a drying oven to remove solvent and cure the resin binder. The glass fabric can be transferred and taken up conventionally on rollers.

EXAMPLE 1

The composition for a particularly preferred insulation material in shown in Table 2 hereinbelow. In this formulation the amount of aluminum trihydrate present is indicated separately from the resin binder composition.

TABLE 2

| Component | Weight % |
|---|---|
| Glass fabric | 60 |
| Resin binder | 30 |
| Aluminum trihydrate | 10 |
| Resin binder | |
| SC 1008 | 60 |
| Buna-N rubber | 40 |

Comparison of an insulation material according to the present invention with a conventional material reveals superior properties in several respects. The superiority of the present material is defined, however, more by a composite of improved properties, which taken in their entirety establish the material's superiority.

Comparative Example 1

A comparison of the average char rate in (mils/sec) is shown below in Table 3.

TABLE 3

| | Average Char rate (mils/sec) | |
|---|---|---|
| Mach No. | This | Ref. |
| 0.08 | 10 | 9 |
| 0.10 | 12 | 14 |
| 0.12 | 13 | 13.5 |
| 0.14 | 14 | 14 |
| 0.16 | 15 | 14 |

Comparative Example 2

The case temperature of a Stinger rocket motor using the present insulation material is compared with that of a previous material. Throughout the Mach number range of 0.06–0.17, the present insulation material afforded a lower case temperature than that of the reference material.

Comparative Example 3

The average erosion rate and char rate for Stinger motors operating at −40° F. using either the present insulation material or a previous material were compared. The relative erosion or char rate depended upon the position from the front end of the rocket. The positions closer to the front end, e.g., 24–28 inches, showed higher char rates and lower erosion rates for the reference material than for the present insulation material. At greater distances from the front end of the motor, e.g., 28–36 inches from the front end, the reference material had a lower char rate and lower erosion rate than the present material.

The present invention has been described with preference to certain examples for purposes of clarity and understanding. It should be appreciated, however, that the present invention is not limited by those examples, but instead by the appended claims and the equivalents thereto. Certain obvious improvements and modifications apparent to those skilled in the art can be practiced within the scope of the appended claims.

What is claimed is:

1. A non-asbestos rocket motor insulation material comprising:
   (1) about 35–75% by weight of a glass fiber fabric; and
   (2) about 25–65% by weight of a resin composition coated onto said glass fiber fabric, said resin composition consists of (i) about 30–60% by weight of a phenolic resin, (ii) about 1–30% by weight of an acrylonitrile-butadiene acrylic acid terpolymer, and (iii) about 5–40% by weight of alumina trihydrate.

2. The insulation material of claim 1, wherein the glass fiber fabric includes E-glass or S-glass fibers.

3. The insulation material of claim 1, wherein the glass fabric is a glass weave fabric in knit, mat or braid form with plain, leno, satin or basket styles.

4. The insulation material of claim 1, wherein the phenolic resin has a pK of about 4 to 10 and a specific gravity of about 0.8 to 1.4 g/cc.

5. The insulation material of claim 1, wherein the glass fabric has a density of about 2.3 oz/yd$^2$.

6. The insulation material of claim 1, wherein the phenolic resin has a pKa of 8.2, and a specific gravity of 1.1 g/cc.

7. The insulation material of claim 1, wherein the alumina trihydrate has an average particle size of 8.5 microns and a density of 1.3 g/cc.

8. The insulation material of claim 1, wherein the glass fabric is present in an amount of about 60% by weight.

9. The insulation material of claim 1, wherein the resin composition exclusive of aluminum trihydrate is present in an amount of about 30% by weight.

10. The insulation material of claim 1, wherein the phenolic resin is present in an amount of about 60% by weight, and wherein the acrylonitrile-butadiene-acrylic acid terpolymer is present in an amount of about 40% by weight.

11. The insulation material of claim 1, wherein the alumina trihydrate is present in an amount of about 10% by weight of insulation.

12. A rocket motor containing the insulation material of claim 1.

13. The rocker motor of claim 12, having an outer metal casing defining an inner wall, wherein the insulation material is adhesively bound to the inner wall of the outer metal casing.

14. A method of making an impregnated insulation fabric insulation material for a rocket motor comprising the steps of:
   (a) forming a resin mixture consisting of (i) about 1–30% by weight of a phenolic resin, (ii) about 1–30% by weight of an acrylonitrile-butadiene-acrylic acid terpolymer, (iii) about 5–40% by weight of an alumina trihydrate, and (iv) about 57% by weight of an organic solvent; and then
   (b) applying the resin mixture to a glass fabric in a ratio of about 40 parts resin mixture to 60 parts glass fabric to form an impregnated insulation fabric.

15. The method of claim 14, further comprising the step of (c) drying the impregnated fabric to remove the organic solvent therefrom.

16. The method of claim 14, wherein phenolic resin has solids present in an amount of 30–80% by weight, a pK of about 4 to 10, and a specific gravity of about 0.8 to 1.4 g/cc.

17. The method of claim 14, wherein the acrylonitrile-butadiene-acrylic acid terpolymer has solids present in an amount of 22–26% by weight.

* * * * *